(12) United States Patent
Liu et al.

(10) Patent No.: US 11,122,494 B2
(45) Date of Patent: Sep. 14, 2021

(54) ACCESS METHOD, AND TERMINAL

(71) Applicant: GUANGDONG OPPO MOBILE TELECOMMUNICATIONS CORP., LTD., Guangdong (CN)

(72) Inventors: Jianhua Liu, Dongguan (CN); Ning Yang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 80 days.

(21) Appl. No.: 16/480,134

(22) PCT Filed: Jan. 23, 2017

(86) PCT No.: PCT/CN2017/072288
§ 371 (c)(1),
(2) Date: Jul. 23, 2019

(87) PCT Pub. No.: WO2018/133127
PCT Pub. Date: Jul. 26, 2018

(65) Prior Publication Data
US 2019/0387457 A1    Dec. 19, 2019

(51) Int. Cl.
*H04W 4/00* (2018.01)
*H04W 48/08* (2009.01)
(Continued)

(52) U.S. Cl.
CPC ......... *H04W 48/08* (2013.01); *H04W 72/085* (2013.01); *H04W 72/1268* (2013.01);
(Continued)

(58) Field of Classification Search
CPC ..... H04W 48/08; H04W 76/27; H04W 76/10; H04W 72/085; H04W 72/1268; H04W 84/042
See application file for complete search history.

(56) References Cited

U.S. PATENT DOCUMENTS

| 8,705,352 B2 | 4/2014 | Chiu |
| 9,210,650 B2 | 12/2015 | Mao |

(Continued)

FOREIGN PATENT DOCUMENTS

| CN | 102300285 A | 12/2011 |
| CN | 102348254 A | 2/2012 |

(Continued)

OTHER PUBLICATIONS

3GPP TSG-RAN WG3 Meeting #94,Reno, Nevada, US, Nov. 14-18, 2016,Huawei, "Network selection and access control framework for eLTE", R3-162902 (Year: 2016).*

(Continued)

*Primary Examiner* — Maharishi V Khirodhar
(74) *Attorney, Agent, or Firm* — Ladas & Parry LLP

(57) ABSTRACT

The application discloses an access method and a terminal. The method comprises: a terminal determining target access class barring (ACB) policy control parameters according to target feature information, wherein the target feature information comprises at least one of the following: a priority of the terminal, service information of a service having data to be transmitted, and core network information of a core network providing the service having the data to be transmitted; and the terminal accessing a network device according to the target ACB control parameters. In the embodiment of the present application, target ACB control parameters of a terminal are determined according to target feature information; for example, the target ACB control parameters are determined according to any one of a priority of the terminal, service information of a service having data to be transmitted, and core network information of a core network providing the service having the data to be transmitted, thereby improving the diversity of methods for determining (Continued)

```
┌─────────────────────────────────────────────────────┐
│ A terminal determines a target ACB control         │
│ parameter according to target feature information, │
│ here, the target feature information includes       │    210
│ at least one of: an attribute feature of data to    │
│ be transmitted, an attribute feature of a core      │
│ network, or a priority of the terminal, the         │
│ attribute feature of the data to be transmitted is  │
│ to indicate information of a service to which the   │
│ data to be transmitted belongs and the attribute    │
│ feature of the core network is to indicate          │
│ information of the core network providing a service │
│ to which the data to be transmitted belongs         │
└─────────────────────────────────────────────────────┘
                         │
                         ▼                              220
┌─────────────────────────────────────────────────────┐
│ The terminal accesses a network device according    │
│ to the target ACB control parameter                 │
└─────────────────────────────────────────────────────┘
``` the ACB control parameters for a terminal to access a network in an ACB mechanism.

18 Claims, 2 Drawing Sheets

(51) Int. Cl.
    *H04W 76/27*     (2018.01)
    *H04W 76/10*     (2018.01)
    *H04W 72/08*     (2009.01)
    *H04W 72/12*     (2009.01)
    *H04W 84/04*     (2009.01)

(52) U.S. Cl.
    CPC ........... *H04W 76/10* (2018.02); *H04W 76/27* (2018.02); *H04W 84/042* (2013.01)

(56) References Cited

U.S. PATENT DOCUMENTS

| | | | |
|---|---|---|---|
| 2012/0063305 A1 | 3/2012 | Chiu | |
| 2012/0170503 A1* | 7/2012 | Kelley | H04W 48/06 370/312 |
| 2013/0045706 A1* | 2/2013 | Hsu | H04W 48/02 455/404.1 |
| 2013/0308541 A1* | 11/2013 | Mao | H04W 48/06 370/328 |
| 2015/0036489 A1 | 2/2015 | Rajadurai et al. | |
| 2015/0111520 A1 | 4/2015 | Hsu et al. | |
| 2015/0117213 A1* | 4/2015 | Pinheiro | H04L 47/28 370/235 |
| 2015/0119015 A1* | 4/2015 | Gai | H04W 4/02 455/418 |
| 2015/0257088 A1 | 9/2015 | Hsu et al. | |
| 2015/0257161 A1* | 9/2015 | Hsu | H04L 65/80 455/453 |
| 2016/0150366 A1 | 5/2016 | Miller et al. | |
| 2016/0219493 A1* | 7/2016 | Kim | H04W 4/60 |
| 2017/0257791 A1 | 9/2017 | Rajadurai et al. | |
| 2018/0220397 A1 | 8/2018 | Paredes Cabrera et al. | |
| 2018/0295539 A1* | 10/2018 | Feng | H04W 28/0289 |

FOREIGN PATENT DOCUMENTS

| | | |
|---|---|---|
| CN | 10261212 A | 7/2012 |
| CN | 102612113 A | 7/2012 |
| CN | 102761933 A | 10/2012 |
| CN | 103747429 A | 4/2014 |
| CN | 105103620 A | 11/2015 |
| CN | 10532046 A | 2/2016 |
| EP | 3565336 A1 | 11/2019 |
| JP | 2014522163 A | 8/2014 |
| JP | 2014522199 A | 8/2014 |
| JP | 2016524418 A | 8/2016 |
| JP | 2016529845 A | 9/2016 |
| JP | 2017526250 A | 9/2017 |
| RU | 2497308 C2 | 10/2013 |
| WO | 2016006980 A1 | 1/2016 |
| WO | 2016027133 A1 | 2/2016 |

OTHER PUBLICATIONS

First Office Action of the European application No. 17893049.1, dated Jul. 13, 2020.
Written Opinion of the Singaporean application No. 11201906733Y, dated Jul. 20, 2020.
Second Office Action of the Chilean application No. 201902039, dated Aug. 19, 2020.
LG Electronics Inc., Access Control for New RAT, 3GPP TSG-RAN WG2 #96 R2-168418 Reno, USA, Nov. 14-18, 2016.
Ericsson, Access control for NR, 3GPP TSG-RAN WG2 #96 Tdoc R2-168485 Reno, Nevada, USA, Nov. 14-18, 2016.
First Office Action of the Canadian application No. 3051017, dated Sep. 9, 2020.
Decision of Refusal of the Chinese application No. 201780083450.3, dated Sep. 25, 2020.
Supplementary European Search Report in the European application No. 17893049.1, dated Oct. 10, 2019.
English translation of the Written Opinion of the International Search Authority in the international application No. PCT/CN2017/072288, dated Sep. 28, 2017.
First Office Action of the Chinese application No. 201780083450.3, dated Apr. 8, 2020.
Second Office Action of the Chinese Application No. 201780083450.3, dated Jun. 19, 2020.
First Office Action of the Russian application No. 2019126424, dated Apr. 21, 2020.
First Office Action of the Chilean application No. 201902039, dated May 10, 2020.
International Search Report in the international application No. PCT/CN2017/072288, dated Sep. 28, 2017.
Written Opinion of the International Search Authority in the international application No. PCT/CN2017/072288, dated Sep. 28, 2017.
Catt "The ACB parameters for Delay Tolerant Access" 3GPP TSG RAN WG2 Meeting #77 R2-420738 Dresden, Germany, Feb. 6-10, 2011.
"3rd Generation Partnership Project; Technical Specification Group Radio Access Network; Evolved Universal Terrestrial Radio Access (E-UTRA); Radio Resource Control (RRC); Protocol specification (Release 14)" 3GPP TS 36.331 V14.1.0 (Dec. 2016) http://www.3gpp.org.
First Office Action of the Indian application No. 201917032483, dated Jan. 19, 2021.
First Office Action of the Japanese application No. 2019-539747, dated Feb. 26, 2021.
Third Office Action of the Chinese application No. 201784083450.3, dated Feb. 7, 2021.
Second Office Action of the European application No. 17893049.1, dated Dec. 18, 2020.
First Office Action of the Taiwanese application No. 107101611, dated Mar. 26, 2021.
Third Office Action of the European application No. 17893049.1, dated May 10, 2021.
Fourth Office Action of the Chinese application No. 201780083450.3, dated Apr. 16, 2021.
Second Office Action of the Canadian application No. 3051017, dated Jun. 25. 2021.
Second Written Opinion of the Singaporean application No. 11201906733Y, dated Jul. 19, 2021.
Decision of Refusal of the Chinese application No. 201780083450.3, dated Jul. 28, 2021.
First Office Action of the Israel application No. 268179, dated Jul. 25, 2021.

* cited by examiner

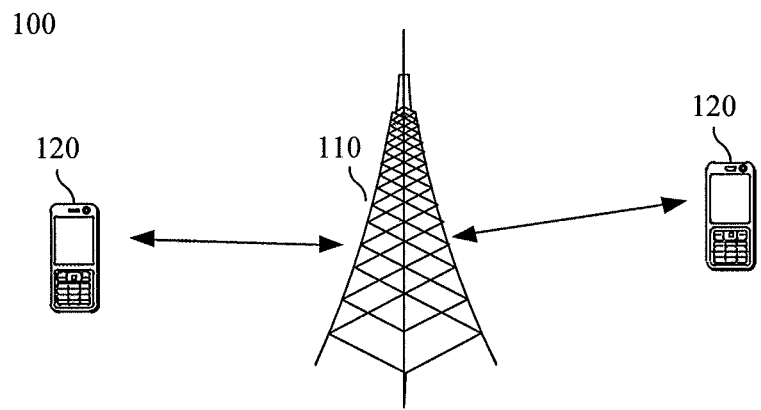

FIG. 1

A terminal determines a target ACB control parameter according to target feature information, here, the target feature information includes at least one of: an attribute feature of data to be transmitted, an attribute feature of a core network, or a priority of the terminal, the attribute feature of the data to be transmitted is to indicate information of a service to which the data to be transmitted belongs and the attribute feature of the core network is to indicate information of the core network providing a service to which the data to be transmitted belongs

210

The terminal accesses a network device according to the target ACB control parameter

ACCESS METHOD, AND TERMINAL

CROSS-REFERENCE TO RELATED APPLICATION

This application is an application under 35 U.S.C. 371 of International Application No. PCT/CN2017/072288 filed on Jan. 23, 2017, the entire contents of which are incorporated herein by reference.

TECHNICAL FIELD

The disclosure relates to the field of communications, and more particularly to an access method and a terminal.

BACKGROUND

In Machine to Machine (M2M) communication, there are numerous Machine Type Communication (MTC) devices, so that a network may be in an overloaded state when the MTC devices are widely used. For example, power outage suddenly occurs in a cell, and when power is restored, massive MTC devices may simultaneously try to access the network, which may cause the network to be in the overloaded state. At present, in a Long Term Evolution (LTE) system, for overload control over an access network, the number of terminals simultaneously accessing the system may be controlled through an Access Class Barring (ACB) mechanism.

However, in the ACB mechanism, an ACB control parameter for a terminal to access a network may be determined only according to an Access Class (AC) of the terminal, so that a method of determining the ACB control parameter for the terminal to access the network is relatively single.

SUMMARY

The disclosure provides an access method and a terminal, so as to improve diversity of methods of determining an ACB control parameter for a terminal to access a network, in an ACB mechanism.

In a first aspect, there is provided an access method, which may include the following operations.

A terminal determines a target ACB control parameter according to target feature information, here, the target feature information includes at least one of: a priority of the terminal, information of a service to which data to be transmitted belongs, or information of a core network providing a service to which data to be transmitted belongs; and the terminal accesses a network device according to the target ACB control parameter.

In embodiments of the disclosure, the target ACB control parameter for the terminal is determined according to the target feature information. For example, the ACB control parameter may be determined according to one of: the priority of the terminal, the information of the service to which the data to be transmitted belongs, or the information of the core network providing the service to which the data to be transmitted belongs. Therefore, diversity of methods of determining the ACB control parameter for the terminal to access the network in an ACB mechanism is improved.

Furthermore, the ACB control parameter is determined according to a combination of different information in the target feature information, so that reasonability of determination of the ACB control parameter may be improved.

In a possible implementation mode of the first aspect, the information of the service to which the data to be transmitted belongs may include at least one of: a priority of the service to which the data to be transmitted belongs, an application class of the service to which the data to be transmitted belongs, a type of a call triggered by transmission of the service to which the data to be transmitted belongs, a type of the service to which the data to be transmitted belongs, or Quality of Service (QoS) required for transmission of the service to which the data to be transmitted belongs.

In a possible implementation mode of the first aspect, the information of the core network providing the service to which the data to be transmitted belongs may include at least one of: a type of the core network, an identifier of the core network, or an identifier of a Public Land Mobile Network (PLMN) containing the core network.

In a possible implementation mode of the first aspect, the target feature information may further include an AC of the terminal.

In the embodiments of the disclosure, the ACB control parameter is determined through the AC and other target feature information, so that factors influencing the ACB control parameter may further be refined on the basis of the related art, and the determined ACB control parameter is more reasonable.

In a possible implementation mode of the first aspect, the operation that the terminal determines the target ACB control parameter according to the target feature information may include the following operation.

The terminal determines the target ACB control parameter according to the target feature information and mapping relationships between feature information and ACB control parameters.

In a possible implementation mode of the first aspect, the target feature information may be the information of the core network providing the service to which the data to be transmitted belongs, and the operation that the terminal determines the target ACB control parameter according to the target feature information and the mapping relationships between the feature information and the ACB control parameters may include that: the terminal determines the target ACB control parameter according to the information of the core network providing the service to which the data to be transmitted belongs and mapping relationships between information of core networks and ACB control parameters.

In a possible implementation mode of the first aspect, the target feature information may be the information of the service to which the data to be transmitted belongs, and the operation that the terminal determines the target ACB control parameter according to the target feature information and the mapping relationships between the feature information and the ACB control parameters may include that: the terminal determines the target ACB control parameter according to the information of the service to which the data to be transmitted belongs, and mapping relationships between information of services and ACB control parameters.

In a possible implementation mode of the first aspect, the operation that the terminal accesses the network device according to the target ACB control parameter may include one of: the terminal establishes a Radio Resource Control (RRC) connection with the network device according to the target ACB control parameter; the terminal establishes a Non-Access Stratum (NAS) connection with the network device according to the target ACB control parameter; or the terminal sends an uplink Scheduling Request (SR) to the network device.

In the embodiments of the disclosure, the terminal may be in a Radio Resource Control (RRC) connected state or an RRC idle state, and after the terminal accesses a network on the basis of the ACB control mechanism, the terminal may establish a RRC connection or a Non-Access Stratum (NAS) connection with the network device. the terminal may also send an uplink Scheduling Request (SR) to the network device. That is, the ACB control mechanism may also be used by the terminal in the RRC connected state to access the network device, and thus the situation in the related art that only a terminal in the RRC idle state may access the network device on the basis of the ACB control mechanism is avoided.

In a possible implementation mode of the first aspect, the method may further include at least one of the following operations: the terminal determines, according to the information of the service to which the data to be transmitted belongs, a bearer on which the data to be transmitted is transmitted; the terminal determines, according to the information of the service to which the data to be transmitted belongs, a data stream in which the data to be transmitted is transmitted; or the terminal determines, according to the information of the service to which the data to be transmitted belongs, a logical channel on which the data to be transmitted is transmitted.

In the embodiments of the disclosure, after the terminal accesses the network on the basis of the information of the service to which the data to be transmitted belongs, the bearer on which the service is transmitted, the logical channel on which the service is transmitted, or the data stream in which the service is transmitted, may directly be determined according to the information of the service, so that a flow of data transmission is saved.

In a possible implementation mode of the first aspect, the target ACB control parameter may include an access grant identifier indicating that the terminal accesses the network device and an access barring identifier indicating that the terminal is barred from accessing the network device, and the operation that the terminal accesses the network device according to the target ACB control parameter may include that: the terminal accesses the network device according to the access grant identifier; or the terminal device does not access the network device according to the access barring identifier.

In a possible implementation mode of the first aspect, the target ACB control parameter may include at least one of an access probability or AC barring time, the method may further include that: the terminal determines a target access probability, and the operation that the terminal accesses the network device according to the target ACB control parameter may include that: responsive to that the target access probability is less than or equal to the access probability and the AC barring time elapses, the terminal accesses the network device; or responsive to that the target access probability is greater than the access probability, the terminal accesses the network device.

In a second aspect, there is provided a terminal, which includes modules configured to perform the method in the first aspect.

In a third aspect, there is provided a terminal, which includes a memory, a processor and a transceiver. The memory is configured to store a program. The processor is configured to execute the program, and when the program is executed, the processor performs the method in the first aspect on the basis of the transceiver.

In a fourth aspect, there is provided a computer-readable medium, which stores a program code for execution. The program code includes an instruction configured to perform the method in the first aspect.

In embodiments of the disclosure, the target ACB control parameter for the terminal is determined according to the target feature information. For example, the ACB control parameter may be determined according to one of: the priority of the terminal; the information of the service to which the data to be transmitted belongs; or the information of the core network providing the service to which the data to be transmitted belongs. Therefore, the diversity of the methods of determining the ACB control parameter for the terminal to access the network in the ACB mechanism is improved.

Furthermore, the ACB control parameter is determined according to the combination of different information in the target feature information, so that the reasonability of determination of the ACB control parameter may be improved.

BRIEF DESCRIPTION OF DRAWINGS

FIG. 1 is a wireless communication system 100 to which embodiments of the disclosure are applied.

FIG. 2 is a flowchart of an access method according to an embodiment of the disclosure.

DETAILED DESCRIPTION

Figure 3:
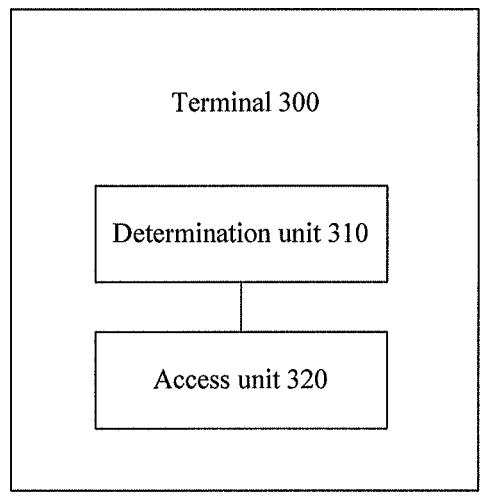
FIG. 3 is a structure diagram of a terminal according to an embodiment of the disclosure.

The technical solutions in the embodiments of the disclosure will be described below in combination with the drawings.

FIG. 1 is a wireless communication system 100 to which the embodiments of the disclosure are applied. The wireless communication system 100 may include a network device 110. The network device 110 may be a device communicating with a terminal device. The network device 110 may provide communication coverage for a specific geographical region and may communicate with a terminal device in the coverage.

A network device and two terminals are exemplarily illustrated in FIG. 1. Optionally, the wireless communication system 100 may include multiple network devices and another number of terminals may be in coverage of each network device. There are no limits made thereto in the embodiments of the disclosure.

Optionally, the wireless communication system 100 may further include another network entity such as a network controller and a mobility management entity. There are no limits made thereto in the embodiments of the disclosure.

It is to be understood that the technical solutions of the embodiments of the disclosure may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), an LTE system, an Advanced Long Term Evolution (LTE-A) system, a Universal Mobile Telecommunication System (UMTS), New Radio Access Technology (NR) and 5th-Generation (5G).

It is also to be understood that in the embodiments of the disclosure, the terminal device may include, but not limited to, a Mobile Station (MS), a mobile terminal, a mobile telephone, User Equipment (UE), a handset, portable equipment and the like. The terminal device may communicate with one or more core networks through a Radio Access Network (RAN). For example, the terminal device may be a mobile phone (or called a "cell" phone), a computer with a wireless communication function and the like. The terminal device may also be a portable, pocket, handheld, computer-embedded or vehicle-mounted mobile device.

In the embodiments of the disclosure, the network device may be an access network device, for example, a base station, a Transmit and Receive Point (TRP) or an access point. The base station may be a Base Transceiver Station (BTS) in the GSM or CDMA, a NodeB in WCDMA, an Evolved Node B (eNB or e-NodeB) in LTE, or a gNB in NR or 5G. There are no specific limits made thereto in the embodiments of the disclosure.

FIG. 2 is a flowchart of an access method according to an embodiment of the disclosure. The method illustrated in FIG. 2 includes the following operations.

In 210, a terminal determines a target ACB control parameter according to target feature information, here, the target feature information includes at least one of: a priority of the terminal, information of a service to which data to be transmitted belongs, or information of a core network providing a service to which data to be transmitted belongs.

Specifically, the priority of the terminal may be a priority determined on the basis of a type of the terminal, and terminals of different types may correspond to different priorities.

It is to be understood that the priority of the terminal may be factory preset.

Optionally, the information of the service to which the data to be transmitted belongs may be an attribute feature of the data to be transmitted, and the information of the service to which the data to be transmitted belongs includes at least one of: a priority of the service to which the data to be transmitted belongs, an application class of the service to which the data to be transmitted belongs, a type of a call triggered by transmission of the service to which the data to be transmitted belongs, a type of the service to which the data to be transmitted belongs, or QoS required for transmission of the service to which the data to be transmitted belongs.

Specifically, the type of the call triggered by transmission of the service to which the data to be transmitted belongs may be a reason of the call triggered by transmission of the service to which the data to be transmitted belongs, for example, an emergency call, a signaling call initiated by the terminal, a data call initiated by the terminal, a multimedia voice call and a multimedia video call.

The application class of the service to which the data to be transmitted belongs may be a priority of an application of the service to which the data to be transmitted belongs.

Optionally, an attribute feature of the core network includes at least one of: a type of the core network, an identifier of the core network, or an identifier of a PLMN containing the core network.

Specifically, the type of the core network may include a circuit switching domain core network and a packet switching domain core network.

Optionally, the target feature information further includes an Access Class (AC) of the terminal.

Specifically, the AC of the terminal may be an AC which is set for the terminal based on an ACB mechanism. An operator may define 16 ACs for terminals by classifying the terminals. Herein, ACs 0-9 are ordinary classes and may be randomly allocated for terminals, AC 10 may correspond to terminals making emergency calls, AC 11 may be configured for network operations, AC 12 may correspond to terminals transmitting security services, AC 13 may correspond to terminals of public service types (for example, water and gas suppliers), AC 14 may correspond to terminals transmitting emergency services, and AC 15 may correspond to terminals of staff of the operator. A terminal may be configured with one class in AC 0-AC 9 and one or more classes in AC 11-AC 15, and these access class information may be stored in a Subscriber Identification Module (SIM) card.

The priority and AC of the terminal are information in two dimensions and the priority of the terminal may be determined on the basis of the type of the terminal. For example, a priority of a mobile phone may be higher than a priority of an electric meter. Although the priority of the mobile phone is high, an AC of the mobile phone may not be high, that is, a mobile phone with a high priority may correspond to a low AC.

In 220, the terminal accesses a network device according to the target ACB control parameter.

Specifically, the operation that the terminal accesses the network device according to the target ACB control parameter may include that the terminal accesses the network device according to the target ACB control parameter, and may further include that the terminal does not access the network device according to the target ACB control parameter.

Optionally, the target ACB control parameter includes at least one of an access probability or AC barring time.

Specifically, the access probability is also called a barring factor, and is used to determine whether the terminal can access the network device. The AC barring time indicates the time for which the terminal is required to wait before initiating access to the network device next time, when the terminal is barred from accessing the network device.

The AC barring time may directly indicate the time, for example 5s, for which the terminal is required to wait before initiating access to the network device next time. The AC barring time may also indirectly indicate the time for which the terminal is required to wait before initiating access to the network device next time, for example, the AC barring time may be an input factor in a random function configured to calculate the AC barring time.

Optionally, the target ACB control parameter may further include an access identifier indicating that the terminal is allowed to access and an access identifier indicating that the terminal is barred from accessing.

Optionally, as an embodiment, the operation that the terminal determines the target ACB control parameter according to the target feature information includes that: the terminal determines the target ACB control parameter according to the target feature information and mapping relationships between feature information and ACB control parameters.

The mapping relationships between the feature information and the ACB control parameters may be configured for the terminal by the network device. The mapping relationships between the feature information and the ACB control parameters may also be specified in a protocol.

Optionally, as an embodiment, the target feature information is the information of the core network providing the service to which the data to be transmitted belongs, and the operation that the terminal determines the target ACB control parameter according to the target feature information and the mapping relationships between the feature information and the ACB control parameters includes that: the terminal determines the target ACB control parameter according to the information of the core network providing the service to which the data to be transmitted belongs and mapping relationships between information of core networks and ACB control parameters.

The mapping relationships between the information of the core networks and the ACB control parameters may be configured for the terminal by the network device. The mapping relationships between the information of the core networks and the ACB control parameters may also be specified in the protocol.

Optionally, as an embodiment, the target feature information is the information of the service to which the data to be transmitted belongs, and the operation that the terminal determines the target ACB control parameter according to the target feature information and the mapping relationships between the feature information and the ACB control parameters includes that: the terminal determines the target ACB control parameter according to the information of the service to which the data to be transmitted belongs and mapping relationships between information of services and ACB control parameters.

The mapping relationships between the information of the services and the ACB control parameters may be configured for the terminal by the network device. The mapping relationships between the information of the services and the ACB control parameters may also be specified in the protocol.

Optionally, as an embodiment, the operation that the terminal accesses the network device according to the target ACB control parameter includes one of: the terminal establishes an RRC connection with the network device according to the target ACB control parameter; the terminal establishes a NAS connection with the network device according to the target ACB control parameter; or the terminal sends an uplink SR to the network device.

Specifically, the operation that the terminal establishes the RRC connection with the network device according to the target ACB control parameter may be that the terminal in an RRC idle state establishes the RRC connection with the network device (for example, an access network device).

The operation that the terminal establishes the NAS connection with the network device according to the target ACB control parameter may be that the terminal in an RRC connected state establishes the NAS connection with the network device (for example, a core network device).

The terminal in the RRC connected state, after accessing the network device according to the target ACB control parameter, may immediately send the uplink Scheduling Request (SR) to the network device.

Optionally, as an embodiment, the method further includes at least one of the following operations: the terminal determines, according to the information of the service to which the data to be transmitted belongs, a bearer on which the data to be transmitted is transmitted; the terminal determines, according to the information of the service to which the data to be transmitted belongs, a data stream in which the data to be transmitted is transmitted; or the terminal determines, according to the information of the service to which the data to be transmitted belongs, a logical channel on which the data to be transmitted is transmitted.

Optionally, as an embodiment, there are mapping relationships between ACB control parameters and bearers, and the operation that the terminal determines the target ACB control parameter according to the information of the service to which the data to be transmitted belongs includes that: the terminal determines a target bearer according to the information of the service to which the data to be transmitted belongs; and the terminal determines the target ACB control parameter according to the target bearer and the mapping relationships between the ACB control parameters and the bearers.

Optionally, as an embodiment, there are mapping relationships between ACB control parameters and data streams, and the operation that the terminal determines the target ACB control parameter according to the information of the service to which the data to be transmitted belongs includes that: the terminal determines a target data stream according to the information of the service to which the data to be transmitted belongs; and the terminal determines the target ACB control parameter according to the target data stream and the mapping relationships between the ACB control parameters and the data streams.

Optionally, as an embodiment, there are mapping relationships between ACB control parameters and logical channels, and the operation that the terminal determines the target ACB control parameter according to the information of the service to which the data to be transmitted belongs includes that: the terminal determines a target logical channel according to the information of the service to which the data to be transmitted belongs; and the terminal determines the target ACB control parameter according to the target logical channel and the mapping relationships between the ACB control parameters and the logical channels.

Optionally, as an embodiment, the target ACB control parameter includes an access grant identifier indicating that the terminal accesses the network device and an access barring identifier indicating that the terminal is barred from accessing the network device, and the operation that the terminal accesses the network device according to the target ACB control parameter includes that: the terminal accesses the network device according to the access grant identifier; or the terminal device does not access the network device according to the access barring identifier.

Optionally, as an embodiment, the target ACB control parameter includes at least one of an access probability or AC barring time, the method further includes that: the terminal determines a target access probability, and the operation that the terminal accesses the network device according to the target ACB control parameter includes that: responsive to that the target access probability is less than or equal to the access probability and the AC barring time elapses, the terminal accesses the network device; or responsive to that the target access probability is greater than the access probability, the terminal accesses the network device.

The access method of the embodiments of the disclosure is described above in combination with FIG. 1 and FIG. 2 in detail. A terminal of the embodiments of the disclosure will be described below in combination with FIG. 3 and FIG. 4 in detail. It is to be understood that the terminal illustrated in FIG. 3 and FIG. 4 may implement each operation in FIG. 2 and will not be elaborated herein for avoiding repetitions. FIG. 3 is a structure diagram of a terminal according to an embodiment of the disclosure. The terminal 300 illustrated in FIG. 3 includes a determination unit 310 and an access unit 320.

The determination unit 310 is configured to determine a target ACB control parameter according to target feature information, here, the target feature information includes at least one of: a priority of the terminal, information of a service to which data to be transmitted belongs, or information of a core network providing a service to which data to be transmitted belongs.

The access unit 320 is configured to access a network device according to the target ACB control parameter.

Optionally, as an embodiment, the information of the service to which the data to be transmitted belongs includes at least one of: a priority of the service to which the data to be transmitted belongs, an application class of the service to which the data to be transmitted belongs, a type of a call triggered by transmission of the service to which the data to be transmitted belongs, a type of the service to which the data to be transmitted belongs, or QoS required for transmission of the service to which the data to be transmitted belongs.

Optionally, as an embodiment, the information of the core network providing the service to which the data to be transmitted belongs includes at least one of: a type of the core network, an identifier of the core network, or an identifier of a PLMN containing the core network.

Optionally, as an embodiment, the target feature information further includes an AC of the terminal.

Optionally, as an embodiment, the determination unit is specifically configured to determine the target ACB control parameter according to the target feature information and mapping relationships between feature information and ACB control parameters.

Optionally, as an embodiment, the target feature information is the information of the core network providing the service to which the data to be transmitted belongs, and the determination unit is further specifically configured to determine the target ACB control parameter according to the information of the core network providing the service to which the data to be transmitted belongs and mapping relationships between information of core networks and ACB control parameters.

Optionally, as an embodiment, the target feature information is the information of the service to which the data to be transmitted belongs, and the determination unit is further specifically configured to determine the target ACB control parameter according to the information of the service to which the data to be transmitted belongs and mapping relationships between information of services and ACB control parameters.

Optionally, as an embodiment, the access unit is specifically configured to perform one of: establishing an RRC connection with the network device according to the target ACB control parameter; establishing a NAS connection with the network device according to the target ACB control parameter; or sending an uplink SR to the network device.

Optionally, as an embodiment, the determination unit is further configured to perform at least one of: determining, according to the information of the service to which the data to be transmitted belongs, a bearer on which the data to be transmitted is transmitted; determining, according to the information of the service to which the data to be transmitted belongs, a data stream in which the data to be transmitted is transmitted; or determining, according to the information of the service to which the data to be transmitted belongs, a logical channel on which the data to be transmitted is transmitted.

Optionally, as an embodiment, the target ACB control parameter includes an access grant identifier indicating that the terminal accesses the network device and an access barring identifier indicating that that the terminal is barred from accessing the network device, and the access unit is specifically configured to access the network device according to the access grant identifier, or not access the network device according to the access barring identifier.

Optionally, as an embodiment, the target ACB control parameter includes at least one of an access probability or AC barring time, the determination unit is further configured to determine a target access probability, and the access unit is specifically configured to, responsive to that the target access probability is less than or equal to the access probability and the AC barring time elapses, access the network device; or responsive to that the target access probability is greater than the access probability, access the network device.

Figure 4:
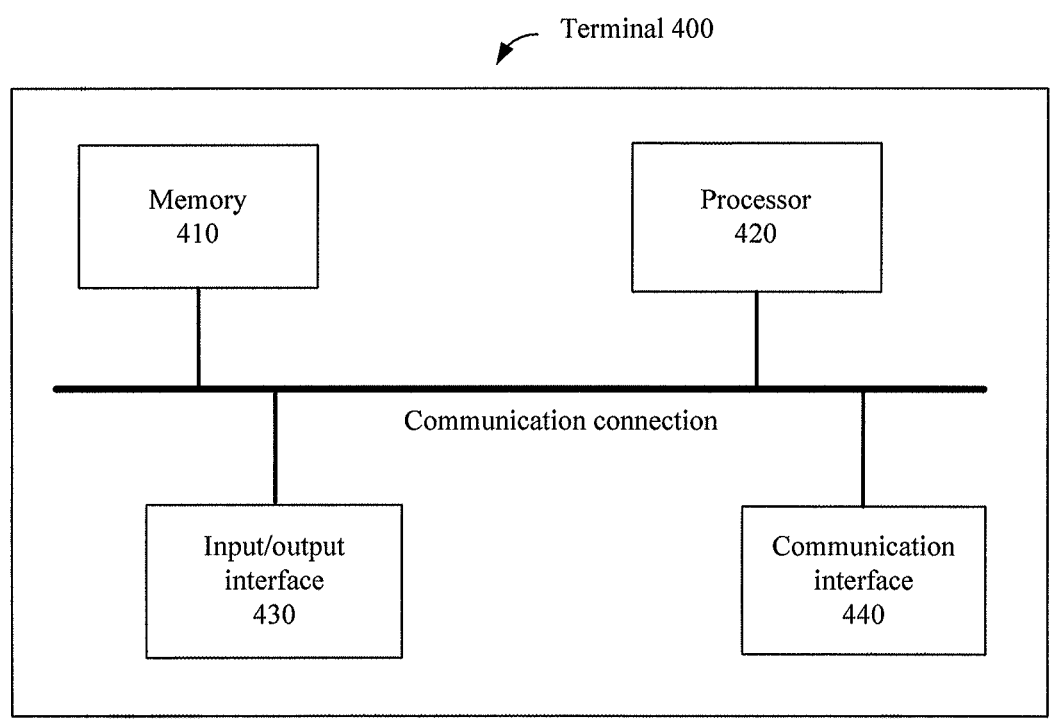
FIG. 4 is a block diagram of a terminal according to another embodiment of the disclosure.

FIG. 4 is a block diagram of a terminal according to another embodiment of the disclosure. The terminal 400 illustrated in FIG. 4 includes a memory 410, a processor 420, an input/output interface 430 and a communication interface 440. Herein, the memory 410, the processor 420, the input/output interface 430 and the communication interface 440 are connected through an internal connecting path. The memory 410 is configured to store an instruction. The processor 420 is configured to execute the instruction stored in the memory 420 to control the input/output interface 430 to receive input data and input information and to output data such as an operation result, and control the communication interface 440 to send a signal.

The processor 420 is configured to determine a target ACB control parameter according to target feature information, here, the target feature information includes at least one of: a priority of the terminal, information of a service to which data to be transmitted belongs, or information of a core network providing a service to which data to be transmitted belongs; and is configured to access a network device according to the target ACB control parameter.

In the embodiment of the disclosure, the processor 420 may be a universal Central Processing Unit (CPU), a microprocessor, an Application Specific Integrated Circuit (ASIC) or one or more integrated circuits, and is configured to execute a related program to implement the technical solution provided in the embodiments of the disclosure.

It is also to be understood that the communication interface 440 uses, for example, but not limited to, a transceiver device such as a transceiver to implement communication between the terminal 400 and other device or a communication network.

The memory 410 may include a Read-Only Memory (ROM) and a Random Access Memory (RAM) and provides an instruction and data for the memory 410. A part of the processor 420 may further include a nonvolatile RAM. For example, the memory 410 may further store information on a device type.

Optionally, as an embodiment, the information of the service to which the data to be transmitted belongs includes at least one of: a priority of the service to which the data to be transmitted belongs, an application class of the service to which the data to be transmitted belongs, a type of a call triggered by transmission of the service to which the data to be transmitted belongs, a type of the service to which the data to be transmitted belongs, or QoS required for transmission of the service to which the data to be transmitted belongs.

Optionally, as an embodiment, the information of the core network providing the service to which the data to be transmitted belongs includes at least one of: a type of the core network, an identifier of the core network, or an identifier of a PLMN containing the core network.

Optionally, as an embodiment, the target feature information further includes an AC of the terminal.

Optionally, as an embodiment, the processor 420 is specifically configured to determine the target ACB control parameter according to the target feature information and mapping relationships between feature information and ACB control parameters.

Optionally, as an embodiment, the target feature information is the information of the core network providing the service to which the data to be transmitted belongs, and the processor 420 is further specifically configured to determine the target ACB control parameter according to the information of the core network providing the service to which the data to be transmitted belongs and mapping relationships between information of core networks and ACB control parameters.

Optionally, as an embodiment, the target feature information is the information of the service to which the data to be transmitted belongs, and the processor 420 is further specifically configured to determine the target ACB control parameter according to the information of the service to which the data to be transmitted belongs and mapping relationships between information of services and ACB control parameters.

Optionally, as an embodiment, the processor 420 is specifically configured to perform one of: establishing an RRC connection with the network device according to the target ACB control parameter; establishing a NAS connection with the network device according to the target ACB control parameter; or sending an uplink SR to the network device.

Optionally, as an embodiment, the processor 420 is further configured to perform at least one of: determining, according to the information of the service to which the data to be transmitted belongs, a bearer on which the data to be transmitted is transmitted; determining, according to the information of the service to which the data to be transmitted belongs, a data stream in which the data to be transmitted is transmitted; or determining, according to the information of the service to which the data to be transmitted belongs, a logical channel on which the data to be transmitted is transmitted.

Optionally, as an embodiment, the target ACB control parameter includes an access grant identifier indicating that the terminal accesses the network device and an access barring identifier indicating that the terminal is barred from accessing the network device, and the processor 420 is specifically configured to access the network device according to the access grant identifier, or not access the network device according to the access barring identifier.

Optionally, as an embodiment, the target ACB control parameter includes at least one of an access probability or AC barring time, the processor 420 is further configured to determine a target access probability. The processor 420 is specifically configured to, responsive to that the target access probability is less than or equal to the access probability and the AC barring time elapses, access the network device; or responsive to that the target access probability is greater than the access probability, access the network device.

It is to be understood that in the embodiments of the disclosure, "B corresponding to A" represents that B is associated with A and B may be determined according to A. It is also to be understood that determining B according to A does not mean that B is determined only according to A and B may also be determined according to A and/or other information.

It is to be understood that term "and/or" in the disclosure is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

It is to be understood that in various embodiments of the disclosure, a magnitude of a sequence number of each process does not mean an execution sequence and the execution sequence of each process should be determined by its function and an internal logic and should not form any limit to an implementation process of the embodiments of the disclosure.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some features may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the disclosure. The abovementioned storage medium includes: various media capable of storing program codes, such as a U disk, a mobile hard disk, a ROM, a RAM, a magnetic disk or an optical disk.

The invention claimed is:

1. An access method, comprising:
   determining, by a terminal, a target Access Class Barring (ACB) control parameter according to target feature information, the target feature information comprising an Access Class (AC) of the terminal and further comprising at least one of: a priority of the terminal determined on the basis of a type of the terminal, information of a service to which data to be transmitted belongs, or information of a core network providing a service to which data to be transmitted belongs;
   in response to the target feature information comprising the AC of the terminal and the priority of the terminal determined on the basis of the type of the terminal, determining, by the terminal, the target ACB control parameter according to the target feature information comprising the AC of the terminal and the priority of the terminal determined on the basis of the type of the terminal, wherein the priority and AC of the terminal are information in two dimensions, and it is allowed that the terminal with a high priority corresponds to a low AC; and accessing, by the terminal, a network device according to the target ACB control parameter.

2. The method of claim 1, wherein the information of the service to which the data to be transmitted belongs comprises at least one of:
   a priority of the service to which the data to be transmitted belongs,
   an application class of the service to which the data to be transmitted belongs,
   a type of a call triggered by transmission of the service to which the data to be transmitted belongs,
   a type of the service to which the data to be transmitted belongs, or
   Quality of Service (QoS) required for transmission of the service to which the data to be transmitted belongs.

3. The method of claim 1, wherein the information of the core network providing the service to which the data to be transmitted belongs comprises at least one of:
   a type of the core network,
   an identifier of the core network, or
   an identifier of a Public Land Mobile Network (PLMN) containing the core network.

4. The method of claim 1, wherein determining, by the terminal, the target ACB control parameter according to the target feature information comprises:
   determining, by the terminal, the target ACB control parameter according to the target feature information and mapping relationships between feature information and ACB control parameters.

5. The method of claim 4, wherein the target feature information is the information of the core network providing the service to which the data to be transmitted belongs, and
   determining, by the terminal, the target ACB control parameter according to the target feature information and the mapping relationships between the feature information and the ACB control parameters comprises:
   determining, by the terminal, the target ACB control parameter according to the information of the core network providing the service to which the data to be transmitted belongs and mapping relationships between information of core networks and ACB control parameters.

6. The method of claim 4, wherein the target feature information is the information of the service to which the data to be transmitted belongs, and
   determining, by the terminal, the target ACB control parameter according to the target feature information and the mapping relationships between the feature information and the ACB control parameters comprises:
   determining, by the terminal, the target ACB control parameter according to the information of the service to which the data to be transmitted belongs and mapping relationships between information of services and ACB control parameters.

7. The method of claim 1, wherein accessing, by the terminal, the network device according to the target ACB control parameter comprises one of:
   establishing, by the terminal, a Radio Resource Control (RRC) connection with the network device according to the target ACB control parameter;
   establishing, by the terminal, a Non-Access Stratum (NAS) connection with the network device according to the target ACB control parameter; or
   sending, by the terminal, an uplink Scheduling Request (SR) to the network device.

8. The method of claim 1, wherein the target ACB control parameter comprises an access grant identifier indicating that the terminal accesses the network device and an access barring identifier indicating that the terminal is barred from accessing the network device, and
   accessing, by the terminal, the network device according to the target ACB control parameter comprises:
   accessing, by the terminal, the network device according to the access grant identifier; or
   not accessing, by the terminal, the network device according to the access barring identifier.

9. The method of claim 1, wherein the target ACB control parameter comprises at least one of an access probability or Access Class (AC) barring time,
   the method further comprises:
   determining, by the terminal, a target access probability, and accessing, by the terminal, the network device according to the target ACB control parameter comprises:
   responsive to that the target access probability is less than or equal to the access probability and the AC barring time elapses, accessing, by the terminal, the network device; or
   responsive to that the target access probability is greater than the access probability, accessing, by the terminal, the network device.

10. A terminal, comprising:
    a memory; and
    a processor coupled to the memory, wherein
    the processor is configured to:
    determine a target Access Class Barring (ACB) control parameter according to target feature information, the target feature information comprising an Access Class (AC) of the terminal and further comprising at least one of: a priority of the terminal determined on the basis of a type of the terminal, information of a service to which data to be transmitted belongs, or information of a core network providing a service to which data to be transmitted belongs;
    in response to the target feature information comprising the AC of the terminal and the priority of the terminal determined on the basis of the type of the terminal, determine, by the terminal, the target ACB control parameter according to the target feature information comprising the AC of the terminal and the priority of the terminal determined on the basis of the type of the terminal, wherein the priority and AC of the terminal are information in two dimensions, and it is allowed that the terminal with a high priority corresponds to a low AC; and
    access a network device according to the target ACB control parameter determined by the determination unit.

11. The terminal of claim 10, wherein the information of the service to which the data to be transmitted belongs comprises at least one of:
    a priority of the service to which the data to be transmitted belongs,
    an application class of the service to which the data to be transmitted belongs,
    a type of a call triggered by transmission of the service to which the data to be transmitted belongs, a type of the service to which the data to be transmitted belongs, or Quality of Service (QoS) required for transmission of the service to which the data to be transmitted belongs.

12. The terminal of claim 10, wherein the information of the core network providing the service to which the data to be transmitted belongs comprises at least one of:
   a type of the core network,
   an identifier of the core network, or
   an identifier of a Public Land Mobile Network (PLMN) containing the core network.

13. The terminal of claim 10, wherein the processor is configured to:
   determine the target ACB control parameter according to the target feature information and mapping relationships between feature information and ACB control parameters.

14. The terminal of claim 13, wherein the target feature information is the information of the core network providing the service to which the data to be transmitted belongs, and
   the processor is further configured to:
   determine the target ACB control parameter according to the information of the core network providing the service to which the data to be transmitted belongs and mapping relationships between information of core networks and ACB control parameters.

15. The terminal of claim 13, wherein the target feature information is the information of the service to which the data to be transmitted belongs, and
   the processor is further configured to:
   determine the target ACB control parameter according to the information of the service to which the data to be transmitted belongs and mapping relationships between information of services and ACB control parameters.

16. The terminal of claim 10, wherein the processor is configured to perform one of:
   establishing a Radio Resource Control (RRC) connection with the network device according to the target ACB control parameter;
   establishing a Non-Access Stratum (NAS) connection with the network device according to the target ACB control parameter; or
   sending an uplink Scheduling Request (SR) to the network device through a transceiver.

17. The terminal of claim 10, wherein the target ACB control parameter comprises an access grant identifier indicating that the terminal accesses the network device and an access barring identifier indicating that the terminal is barred from accessing the network device, and
   the processor is configured to:
   access the network device according to the access grant identifier; or
   not access the network device according to the access barring identifier.

18. The terminal of claim 10, wherein the ACB control parameter comprises at least one of an access probability or Access Class (AC) barring time,
   the processor is further configured to determine a target access probability, and
   responsive to that the target access probability is less than or equal to the access probability and the AC barring time elapses, access the network device; or
   responsive to that the target access probability is greater than the access probability, access the network device.

* * * * *